(12) United States Patent
Li et al.

(10) Patent No.: US 8,072,946 B2
(45) Date of Patent: Dec. 6, 2011

(54) COORDINATED TRANSMISSIONS IN WIRELESS NETWORKS

(75) Inventors: Guoqing Li, Hillsboro, OR (US);
Qinghua Li, Sunnyvale, CA (US);
Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1163 days.

(21) Appl. No.: 11/394,464

(22) Filed: Mar. 30, 2006

(65) Prior Publication Data

US 2007/0232235 A1 Oct. 4, 2007

(51) Int. Cl.
*H04W 4/00* (2009.01)
(52) U.S. Cl. ............... 370/338; 455/562.1; 455/67.11
(58) Field of Classification Search .............. 370/338; 455/562.1, 67.11, 63.1, 63.2, 63.3, 63.4
See application file for complete search history.

(56) References Cited

U.S. PATENT DOCUMENTS

| | | | |
|---|---|---|---|
| 5,448,753 A * | 9/1995 | Ahl et al. ................. | 455/422.1 |
| 7,352,721 B2 * | 4/2008 | Kim et al. ................. | 370/334 |
| 7,363,050 B2 * | 4/2008 | Nakano .................... | 455/525 |
| 7,400,606 B2 * | 7/2008 | Padovani et al. ........... | 370/335 |
| 7,646,743 B2 * | 1/2010 | Kubler et al. ............. | 370/328 |
| 2002/0065058 A1 * | 5/2002 | Gatherer et al. .......... | 455/272 |
| 2002/0132643 A1 * | 9/2002 | Chang et al. ............. | 455/562 |
| 2002/0181492 A1 * | 12/2002 | Kasami et al. ............ | 370/445 |
| 2004/0157646 A1 * | 8/2004 | Raleigh et al. ........... | 455/562.1 |
| 2005/0003763 A1 * | 1/2005 | Lastinger et al. ......... | 455/63.1 |
| 2005/0068231 A1 * | 3/2005 | Regnier et al. ........... | 342/372 |
| 2005/0070266 A1 * | 3/2005 | Senarath et al. .......... | 455/422.1 |
| 2006/0274704 A1 * | 12/2006 | Desai et al. .............. | 370/338 |

OTHER PUBLICATIONS

Bandyopadhyay, S., et al., "An Adaptive MAC and Directional Routing Protocol for Ad Hoc Wireless Network Using ESPAR Antenna", *ATR Adaptive Communications Research Laboratories*, (2000), 4 pgs.

* cited by examiner

*Primary Examiner* — Rafael Pérez-Gutiérrez
*Assistant Examiner* — Liton Miah
(74) *Attorney, Agent, or Firm* — Cool Patent, P.C.; Kenneth J. Cool

(57) ABSTRACT

Overall network throughput may be increased in a wireless network through coordinated transmission between wireless network stations. A wireless network station selects beamforming information based at least in part on interference to other wireless network stations.

14 Claims, 5 Drawing Sheets

COORDINATED TRANSMISSIONS IN WIRELESS NETWORKS

FIELD

The present invention relates generally to wireless networks, and more specifically to wireless network stations with multiple antennas.

BACKGROUND

Data throughput in many existing wireless local area networks (WLANs) is limited by interference caused by neighboring stations in the network. For example, signals transmitted by one wireless station may interfere with the ability of a neighboring wireless station to communicate. In attempts to maximize data throughput, individual wireless network stations typically select transmit schemes that maximize their own data rate (or throughput). In these circumstances, network-wide data throughput might suffer, in part because conditions that provide network-wide increases in throughput do not necessarily coincide with conditions that prevail when every wireless network station attempts to maximize its own throughput.

DESCRIPTION OF EMBODIMENTS

Figure 1:
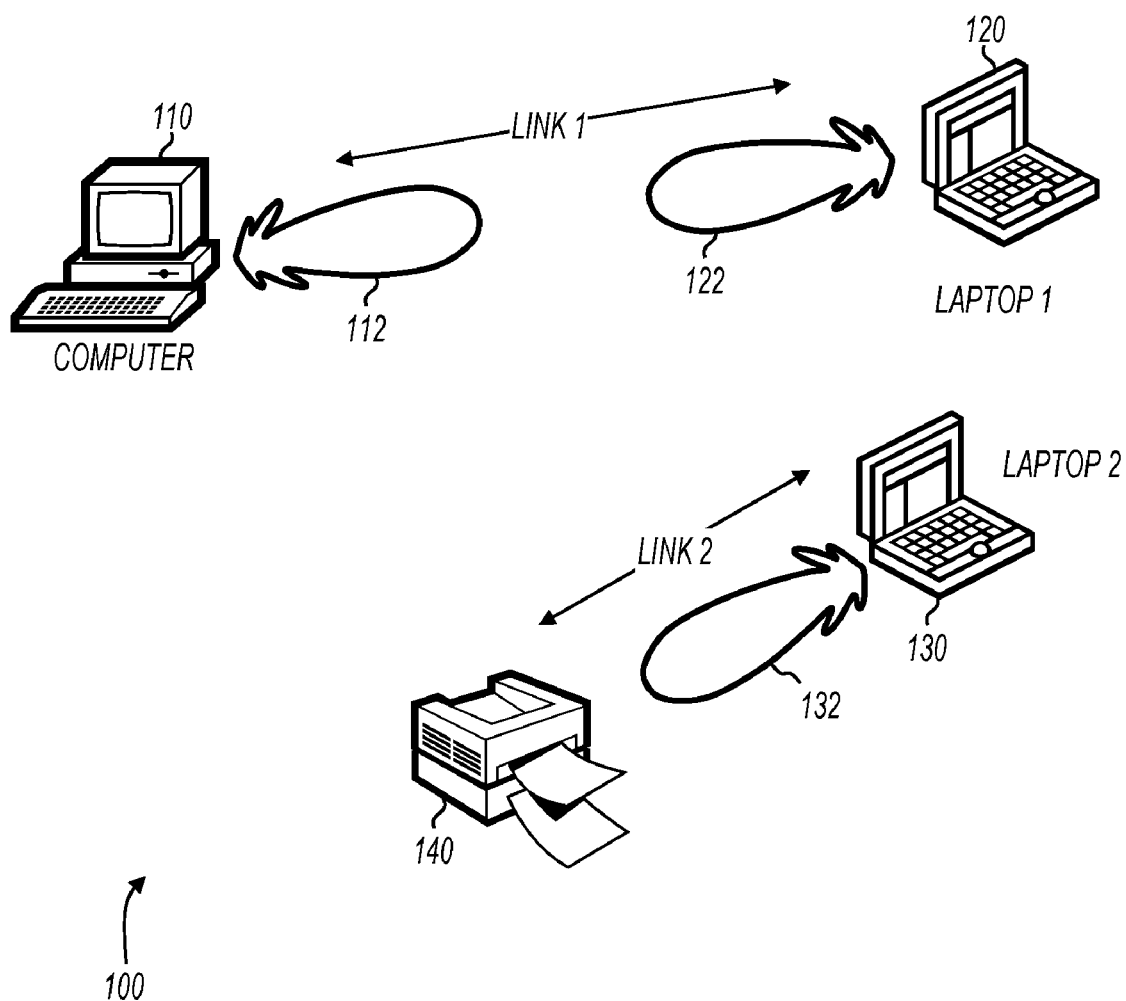
FIG. 1 shows coordinated transmissions in a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows coordinated transmissions in a wireless network. Network 100 includes wireless network stations 110, 120, 130, and 140. Wireless network station 110 is shown as a desktop computer, wireless network stations 120 and 130 are shown as laptop computers, and wireless network station 140 is shown as a printer. In general, any of the wireless network stations may be any type of network-capable device.

In some embodiments, wireless network stations 110, 120, 130, and 140 may operate partially in compliance with, or completely in compliance with, a wireless network standard. For example, stations 110, 120, 130, and 140 may operate partially in compliance with a standard such as IEEE Std. 802.11, 1999 Edition, although this is not a limitation of the present invention. As used herein, the term "802.11" refers to any past, present, or future IEEE 802.11 standard, including, but not limited to, the 1999 edition. Also for example, stations 110, 120, 130, and 140 may operate partially in compliance with any other standard, such as any future IEEE personal area network standard or wide area network standard.

Stations 110, 120, 130, and 140 may include any number of antennas. The "channel" through which the stations communicate may include many possible signal paths. For example, when the stations are in an environment with many "reflectors" (e.g. walls, doors, or other obstructions), many signals may arrive from different paths. This condition is known as "multipath." In some embodiments, wireless stations utilize multiple antennas to take advantage of the multipath and to increase the communications bandwidth. For example, in some embodiments, stations 120 and 140 may communicate using Multiple-Input-Multiple-Output (MIMO) techniques. In general, MIMO systems offer higher capacities by utilizing multiple spatial channels made possible by multipath.

One or more of the wireless network stations shown in FIG. 1 have the ability to form directional antenna patterns when transmitting and/or receiving. When transmitting, directional antenna patterns may be created pointing in a desired direction, thereby sending more energy in the desired direction than in other directions. Similarly, when receiving, directional antenna patterns may be created pointing a desired direction, thereby receiving more energy from the desired direction than from other directions. The directional antenna patters may be formed to point in one or more of the multiple spatial channels as described in the previous paragraph.

The process of creating antenna patterns, or "beams," may be referred to as transmit and receive antenna "beamforming." For example, as shown in FIG. 1, wireless network station 110 uses transmit beamforming to produce transmit beam 112; wireless network station 120 uses receive beamforming to produce receive beam 122; and wireless network station 130 uses transmit beamforming to produce transmit beam 132. Beams may be formed by putting weights at the output/input of antennas. Compared to omni-directional radiation, beamforming can increase the density of simultaneous communications links as shown in FIG. 1, where two links are running simultaneously. If all wireless stations shown in FIG. 1 had omni-directional radiation patterns, enough interference may be produced to limit the links to sequential operation, thereby limiting network throughput.

Various embodiments of the present invention exploit beamforming to form beams for co-channel interference (CCI) reduction and enable multiple simultaneous transmissions for mesh/ad hoc networks. Several novel techniques for physical (PHY) and medium access control (MAC) layers are disclosed herein. For example, each wireless station may collect CCI statistics in idle time and predict transmissions in its vicinity. For each transmission, the wireless network station may select the number of beams and the direction of each beam so that its interference to the network is controlled and the overall throughput of the network is increased.

Two 802.11 compatible techniques are derived to facilitate the CCI statistic collection and estimation. First, each device sends its response packet (e.g. ACK and CTS) using the beamforming weights that were used to receive the previous packet. Second, the response packet is sent by a data rate proportional to the signal to noise ratio (SNR) of the previous packet. The two steps allow the potential sender in the vicinity to estimate its interference level to the neighbors that have beamforming capability.

Figure 2:
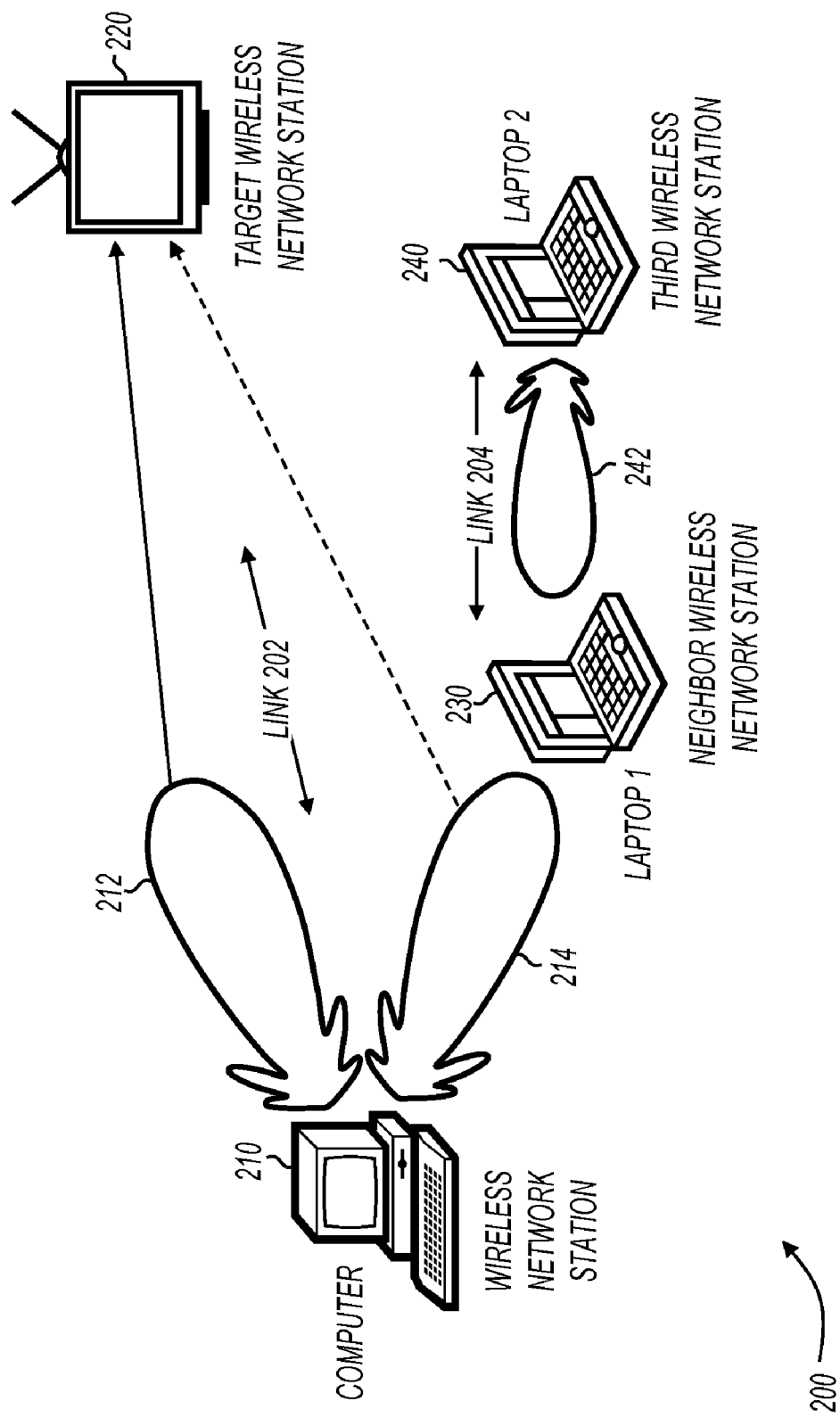
FIG. 2 shows interference from a beamforming wireless network station to a neighboring wireless network station.

FIG. 2 shows interference from a beamforming wireless network station to a neighboring wireless network station. Network 200 includes wireless network stations 210, 220, 230, and 240. Wireless network station 210 is shown as a desktop computer, wireless network station 220 is shown as a television, and wireless network stations 230 and 240 are shown as laptop computers, although this is not a limitation of the present invention. Any of the wireless network stations may be any type of network-capable device.

Figure 3:
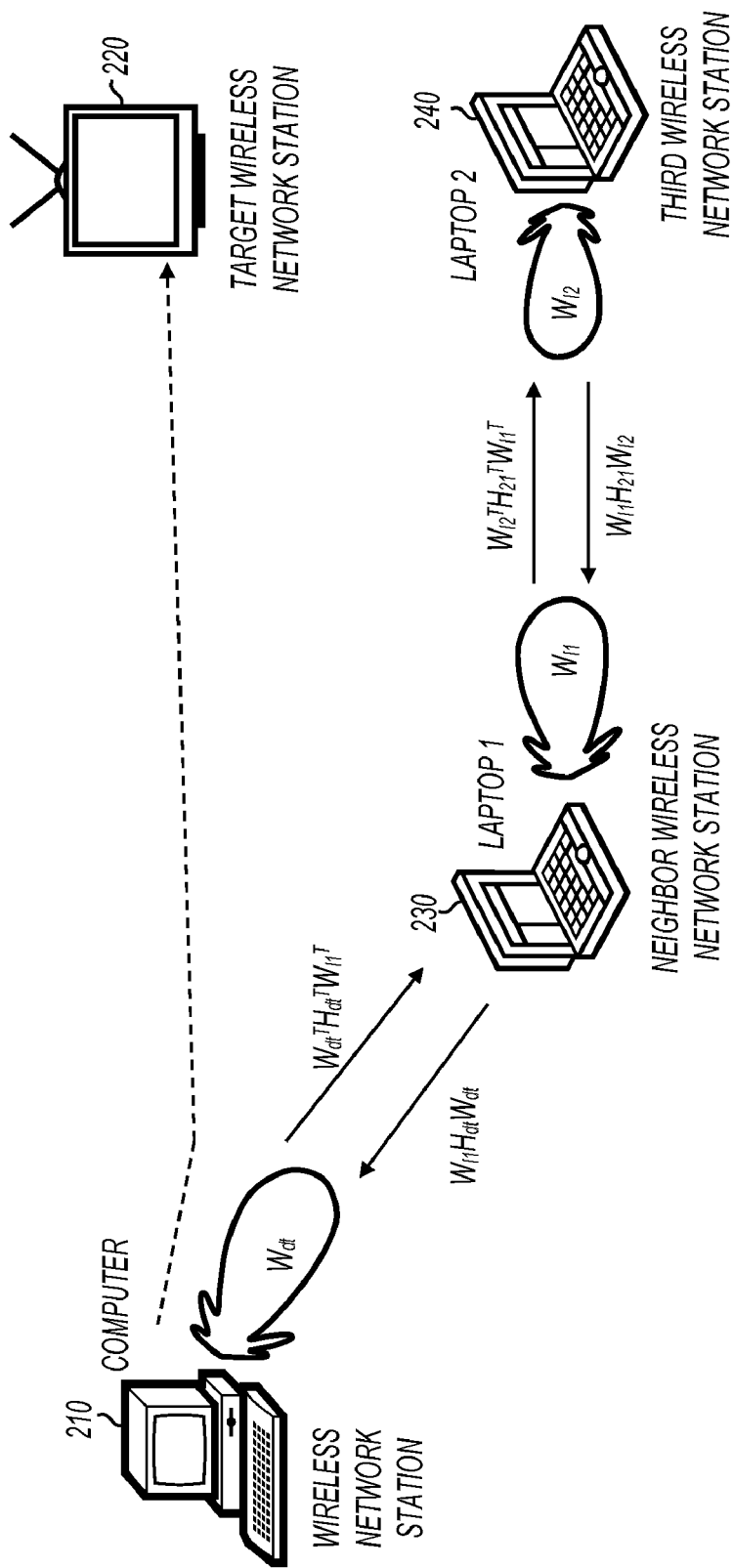
FIG. 3 shows channel characteristics between the various wireless network stations shown in FIG. 2.

The different wireless network stations shown in FIGS. 2 and 3 have been given descriptive references to aid in describing various embodiments of the present invention. For example, wireless network station 210 is referred to simply as the "wireless network station," wireless network station 220 is referred to as the "target wireless network station," wireless network station 230 is referred to as the "neighbor wireless network station," and wireless network station 240 is referred to as the "third wireless network station." In the example network environment of FIG. 2, wireless network station 210 is communicating with target wireless network station 220 over link 202 using beams 212 and 214. Neighbor wireless network station 230 is in the "neighborhood" of wireless network station 210, and is communication with third wireless network station 240 over link 204. As shown in FIG. 2, third wireless network station 240 uses beam 242. Neighbor wireless network station 230 may have multiple antennas, or may have a single omni-directional antenna.

For the example shown in FIG. 2, wireless network station 210 attempts to maximize its link to target wireless network station 220 by sending data through two spatial beams (212, 214) computed from a singular value decomposition (SVD) algorithm. The different spatial beams may have varying "quality." For example beam 212 may be able to carry more data than beam 214. Unfortunately, beam 214 points to neighbor wireless network station 230. As shown in FIG. 2, neighbor wireless network station 230 desires to receive traffic from third wireless network station 240.

In some embodiments, neighbor wireless network station 230 may suffer from interference caused by beam 214 to the point that links 202 and 204 may not be simultaneously supported. Various embodiments of the present invention may increase overall network throughput by the coordination between wireless network stations 210 and 230. Instead of employing two beams, wireless network station 210 may use only beam 212, thereby enabling links 202 and 204 to be operated simultaneously. Although the data rate between wireless network stations 210 and 220 may be reduced, the data rate between wireless network stations 230 and 240 increases. The overall network throughput increases because beam 214 of the desktop is a weaker singular mode and the distance between wireless network stations 230 and 240 is short. In addition, allowing the two links to co-exist brings better fairness to low-capability devices.

In various embodiments of the present invention, wireless network station 210 collects information about its neighbors, from which the interference effects to the neighbors is estimated. For example, wireless network station 210 may collect information such as channel information describing the channel from wireless station 210 to neighbor wireless network station 230, signal to noise ratio (SNR) of the link 204 between neighbor wireless network device 230 and third wireless network device 240, and information describing when neighbor wireless network station is receiving its desired data on link 204.

In some embodiments, the collection of the above-described information is performed in cooperation between the media access control (MAC) layer and physical (PHY) layer within wireless network station 210, in part because addresses of the neighbor stations is in the MAC. An example of information collection and interference estimation is shown in FIG. 3.

FIG. 3 shows channel characteristics between the various wireless network stations shown in FIG. 2. In the specific example of FIGS. 2 and 3, wireless network station 210 is also referred to as "the desktop," target wireless network station 220 is also referred as "the television," neighbor wireless network station 230 is also referred to as "laptop 1," and third wireless network station 240 is also referred to as "laptop 2." The desktop would like to send data to the television, and wants to know its interference to its neighbor, laptop 1. In various embodiments of the present invention, the desktop may collect information as follows.

1) In idle time, the desktop listens to the medium and detects packets sent by laptop1. For the purposes of this description, it is assumed that packets sent by laptop 2 cannot be received by the desktop due to a large distance, although this is not a limitation of the present invention.

2) Obtain transmit/receive schedule of the neighbor.

From the MAC layer of packets received from laptop 1, the desktop extracts the MAC address of laptop 1 and its network allocation vector (NAV) or transmit opportunity (TXOP). By interpreting this information, the desktop knows if laptop 1 is in transmit mode and how long it remains transmitting. Whenever laptop 1 is in transmit mode, the desktop doesn't need to worry about its inference to laptop 1. If the desktop receives clear-to-send (CTS) from laptop 1 and/or request-to-send (RTS) (or other request packet) from laptop 2, the desktop may obtain information about when laptop 1 will stay in receive mode. Whenever laptop 1 is in receive mode, it is potentially vulnerable to interference from the desktop.

3) Obtain channel information describing the channel from the wireless network station to its neighbor.

Because laptop 1 may have multiple receive antennas, it can form receive beams for its reception and the beams may, by null steering, suppress interference caused by the desktop. Accordingly, the receive beam pattern of laptop 1 is of interest to the desktop. The beam pattern can be learned as follows. If laptop 1 employs weight matrix $W_{l1}$ on its receive antennas to receive data sent by laptop 2, then laptop 1 sends response packets (e.g. ACK and CTS) back to laptop 2 using $W_{l1}^T$ on its transmit antennas, where $^T$ denotes transpose. This is the optimal for the reception of laptop 2 if the transmit and receive channels are reciprocal. For the following discussion, we assume all transmit/receive channels are reciprocal, although this is not a limitation of the present invention. After receiving the response packets, the desktop obtains the beamformed channel from laptop 1 to the desktop, $H_{dl}^T W_{l1}^T$, where $H_{dl}$ is the channel from the desktop to laptop 1 and $H_{dl}^T$ is the reverse channel. The beamformed channel from the desktop to laptop 1, which is seen at laptop 1, can be computed at the desktop as $W_{l1} H_{dl} W_{dt}$, where $W_{dt}$ is the tentative beamforming weights that send data to the television.

Since the interfering channel $W_{l1} H_{dl} W_{dt}$ is obtained, the interference power can be computed as $p_{i1} = W_{l1} H_{dl} W_{dt} p_{dt}$, where $p_{i1}$ is the interference power vector at the output of laptop 1's receive beamformer $W_{l1}$ and $p_{dt}$ is the transmit power vector at the input of the desktop's transmit beamformer $W_{dt}$.

4) Obtain signal to interference plus noise ratio (SINR) seen at the neighbor.

The SINR at laptop 1 determines the data rate between laptop 1 and laptop 2 and it may be defined as $$SINR_{l1} = \frac{\|W_{l1} H_{21} W_{l2} p_{21}\|^2}{\|W_{l1} H_{dt} W_{dt} p_{dt}\|^2 + \sigma^2},$$

where the numerator is the desired signal power from laptop 2 to laptop 1 and the denominator is the power of interference plus noise; $\sigma^2$ is the total noise power for all antennas at laptop 1; $\|W_{l1} H_{dt} W_{dt} p_{dt}\|^2$ is the interference from the desktop to laptop 1; $p_{21}$ is the transmit power vector across antennas at laptop 2; $H_{21}$ is the channel matrix from laptop 2 to laptop 1; $W_{l2}$ is the transmit beamforming weights (beamformer) at laptop 2. Since the quantities $H_{21}$, $W_{l2}$, and $p_{21}$ are unknown at the desktop, the SINR can not be directly computed at the desktop. Other definitions of SINR may also be used. One solution is that laptop 1 broadcasts its SINR; however, this is not compatible with existing 802.11 and consumes bandwidth. We show a compatible solution as follows. The desktop detects the data rate of the packets sent by laptop 1 to laptop 2. Since the data rate is proportional to the signal to noise ratio, $$SNR_{l1} = \frac{\|W_{l1} H_{21} W_{l2} p_{21}\|^2}{\sigma^2}$$

and the noise power $\sigma^2$ can be estimated from KTB equation of thermal noise, practical noise figure, and sensitivity requirements from the 802.11 standard, the desired signal power $\|W_{l1} H_{21} W_{l2} p_{21}\|^2$ can be estimated, and thus the $$SINR_{l1} = \frac{\|W_{l1} H_{21} W_{l2} p_{21}\|^2}{\|W_{l1} H_{dt} W_{dt} p_{dt}\|^2 + \sigma^2}$$

can be estimated. In order to signal the SNR, each station always sends acknowledgement packets using a data rate matching to the SNR of the received packet. When the SNR exceeds ~25 dB, which the top rate of 64 QAM is required, the transmitter should back off the power amplifier to reduce the excessive interference to the neighbor.

After the information is collected, the desktop selects a time interval and transmit beamformer $W_{dt}$ to send data to the television. The criterion of the selection is to maximize the whole network throughput instead of link throughput. For example, if the two links: desktop to television, and laptop 1 to laptop 2, transmit and receive half of the time, it is desirable to synchronize the transmissions of the desktop and laptop 1 so that they don't need to reduce data rate, i.e. power, to avoid mutual interference. Once the receive schedule of the neighbors are known and a transmit interval is selected by the desktop, the optimal beamformer $W_{dt}$ that maximizes the network (or neighborhood) throughput for the interval can then be computed as $$W_{dt} = \underset{w}{\operatorname{argmax}} \sum_{i \in neighbors} r_i(w) + r_{dt}(w) \quad (1)$$

where $r_i(W)$ is the data rate of the i-th link in the neighborhood of the desktop; $r_{dt}(W)$ is the data rate from the desktop to the television; all the data rates are proportional to the SINR of each link and the SINR is the function of the beamformer W.

Various simplifications of equation (1) for two types of devices are now described. First, a wireless network station using sectored antennas (for switched diversity) has only one transmit chain and multiple directional antennas. The optimization is to select the optimal antenna that maximizes the neighborhood throughput. The number of candidate beamformers W s equals the number of sectored antennas. This simplifies the computation of (1) significantly.

Second, a wireless network station using spatial mode puncturing employs a beamformer computed from the SVD algorithm, which ignores the interference. The SVD algorithm will typically arrive at a beamforming solution that utilizes multiple spatial channels, or "beamformed channels" in the form of multiple steering vectors in a beamforming matrix. The wireless network station selects a subset of the beamformed channels to send data with radiation power so that the neighborhood throughput is maximized. The number of candidates in (1) is equal to $2^{N_s}$, where $N_s$ is the number of available beamformed channels. The number of available channels $N_s = \min(N_t, N_r)$, where $N_t$ is the number of transmit antennas at the device $N_r$ is the number of receive antennas at the receiving device of the link.

When accounting for QoS and other considerations for each wireless station, the operation of the coordinated transmission may be generalized to multiple stations, each having multiple neighbors as follows.

1) Information Gathered and Organized from PHY

Each wireless network station, say station i, gathers the information listed in Table 1. For each neighboring station j, the physical layer estimates steering vector/vectors (i.e., direction/directions or beam weights that can be used when communicating with this neighbor). The channel estimation can be based on previous overheard messages or based on explicit signaling such as a sounding packet. The information is organized into the following table, where $H_{ij}$ is the channel matrix between device i and device j.

TABLE 1

| Information gathered from PHY | |
|---|---|
| Neighbor list | Steering vector/vectors based on $H_{ij}$ |
| Neighbor 1 | $U^1_{i1}, U^2_{i1}, \ldots$ |
| Neighbor 2 | $U^1_{i2}, U^2_{i2}, \ldots$ |
| Neighbor j | $U^1_{ij}, U^2_{ij}, \ldots$ |
| ... | ... |
| Neighbor N | $U^1_{iN}, U^2_{iN}, \ldots$ |

2) Transmitting Adaptation at MAC Layer

Assume that there are $N_t$ steering vectors that station i can use when communicating with neighbor j, where $N_t$ is dependent on the channel matrix between i and j. Station i then decides whether to use all the steering vectors (i.e., directions) using a pre-defined function. The function can incorporate the QoS of the transmission between stations i and j, previous/predicted activities on all the available directions, interference each direction may cause to each neighbor, etc. (the interference caused to each neighboring station can be calculated from information collection 1-4, described above). The function can be generally expressed as follows:

(recommended steering vectors to be used out of the available steering vectors)$\{W_{dt}\}=F(t_1, \ldots t_M,$ QoS, $I^m{}_n, (m=1, i-1, i+1, \ldots, N, n=1, \ldots, N_t))$ Where $t_k$ is the indication of previous activity in direction k (i.e., activities associated with the $k^{th}$ steering vector). It can be calculated as the number of transmissions overheard on this direction over a pre-defined period of time. QoS is the indication of QoS requirements between stations i and j such as rate and delay parameters. $I^m{}_n$ is the interference caused to the $m^{th}$ neighbor station, if using the $n^{th}$ steering vector. Other factors may also be incorporated into the transmission strategy by adding more parameters into the F function.

Figure 4:
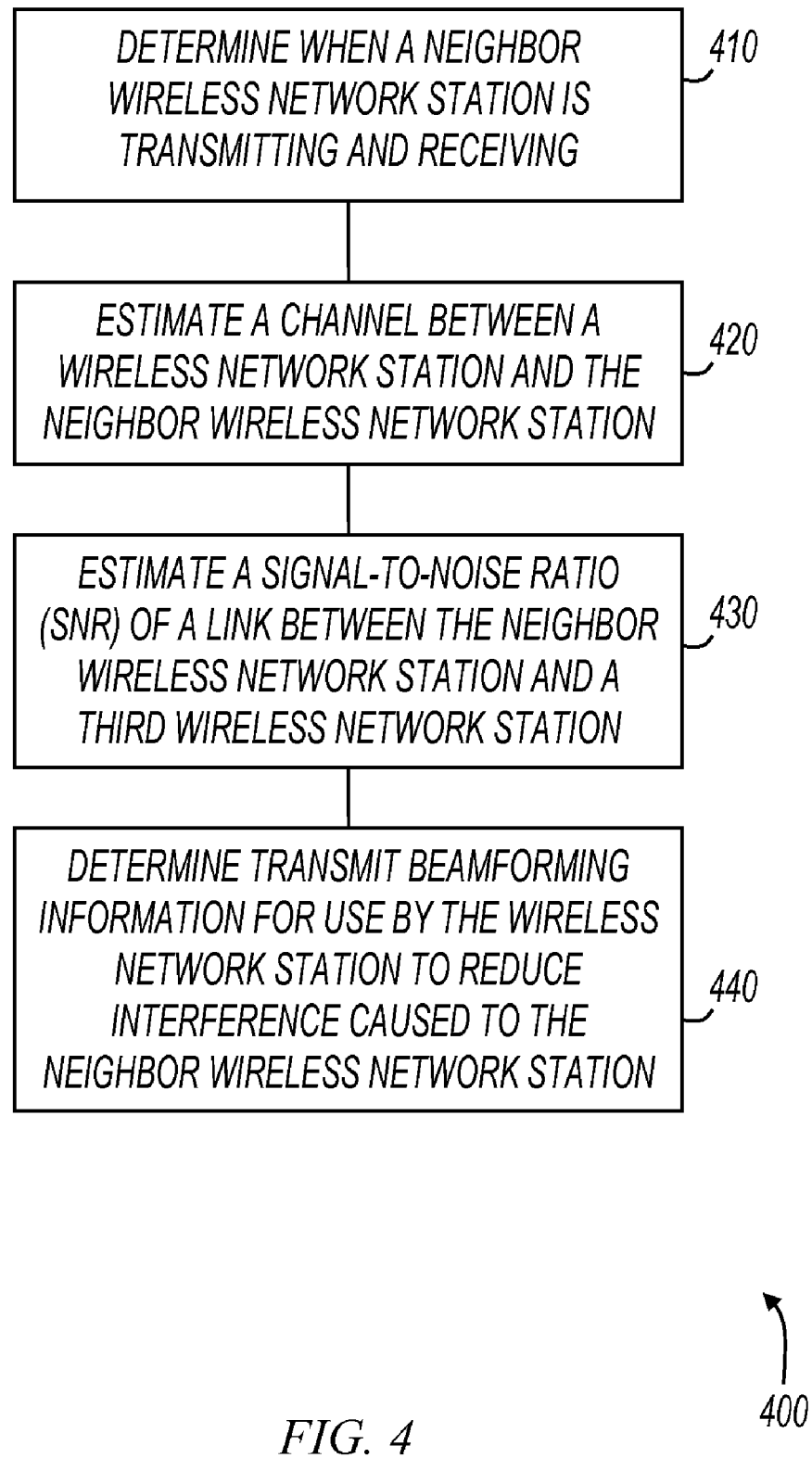
FIG. 4 shows a flowchart in accordance with various embodiments of the present invention.

FIG. 4 shows a flowchart in accordance with various embodiments of the present invention. In some embodiments, method 400 may be used in, or for, a wireless system that utilizes MIMO technology. In some embodiments, method 400, or portions thereof, is performed by a wireless network station, embodiments of which are shown in the various figures. In other embodiments, method 400 is performed by a processor or electronic system. Method 400 is not limited by the particular type of apparatus or software element performing the method. The various actions in method 400 may be performed in the order presented, or may be performed in a different order. Further, in some embodiments, some actions listed in FIG. 4 are omitted from method 400.

Method 400 is shown beginning at block 410 in which a wireless network station determines when a neighbor wireless network station is transmitting and receiving. For example, a wireless network station such as wireless network station 210 (FIGS. 2, 3) may listen for packets from a neighboring station such as neighbor wireless network station 230. The wireless network station may determine the transmit/receive schedule of the neighbor by interpreting NAV values, TXOP values or the like.

At 420, the wireless network station estimates the channel between the wireless network station and the neighbor wireless network station. For example, the desktop in FIG. 3 may estimate the channel between the desktop and laptop 1. At 430, the wireless network station estimates a signal-to-noise ratio (SNR) between the neighbor wireless network station and a third wireless network station. For example, the desktop in FIG. 3 may estimate the SNR of the link between laptop I and laptop 2. The SNR may be estimated by detecting a data rate of packets as described above with reference to FIG. 3.

At 440, the wireless network station determines transmit beamforming information for use by the wireless network station to reduce interference caused to the neighbor wireless network station. In some embodiments, the beamforming information corresponds to the selection of one antenna from a plurality of sectorized antennas. In other embodiments, the beamforming information corresponds to a spatial puncturing operation where one or more steering vectors are removed from a beamforming matrix. For example, a beamforming matrix may be developed as if the wireless network station was maximizing its own throughput regardless of the presence of any neighboring station(s). The operations of 420 may then correspond to the non-use of a portion of that beamforming matrix.

In some embodiments, beamforming information is determined by attempting to maximize network throughput at least in the neighborhood of the wireless network station. For example, beamforming information may be selected from a set of possible solutions using equation (1), above.

Method 400 is described in the context of a wireless network station determining beamforming information to reduce interference to a single neighboring wireless station, although this is not a limitation of the present invention. For example, a wireless network station may have multiple neighboring stations, and method 400 may be performed to reduce interference to more than one of the neighboring stations.

Figure 5:
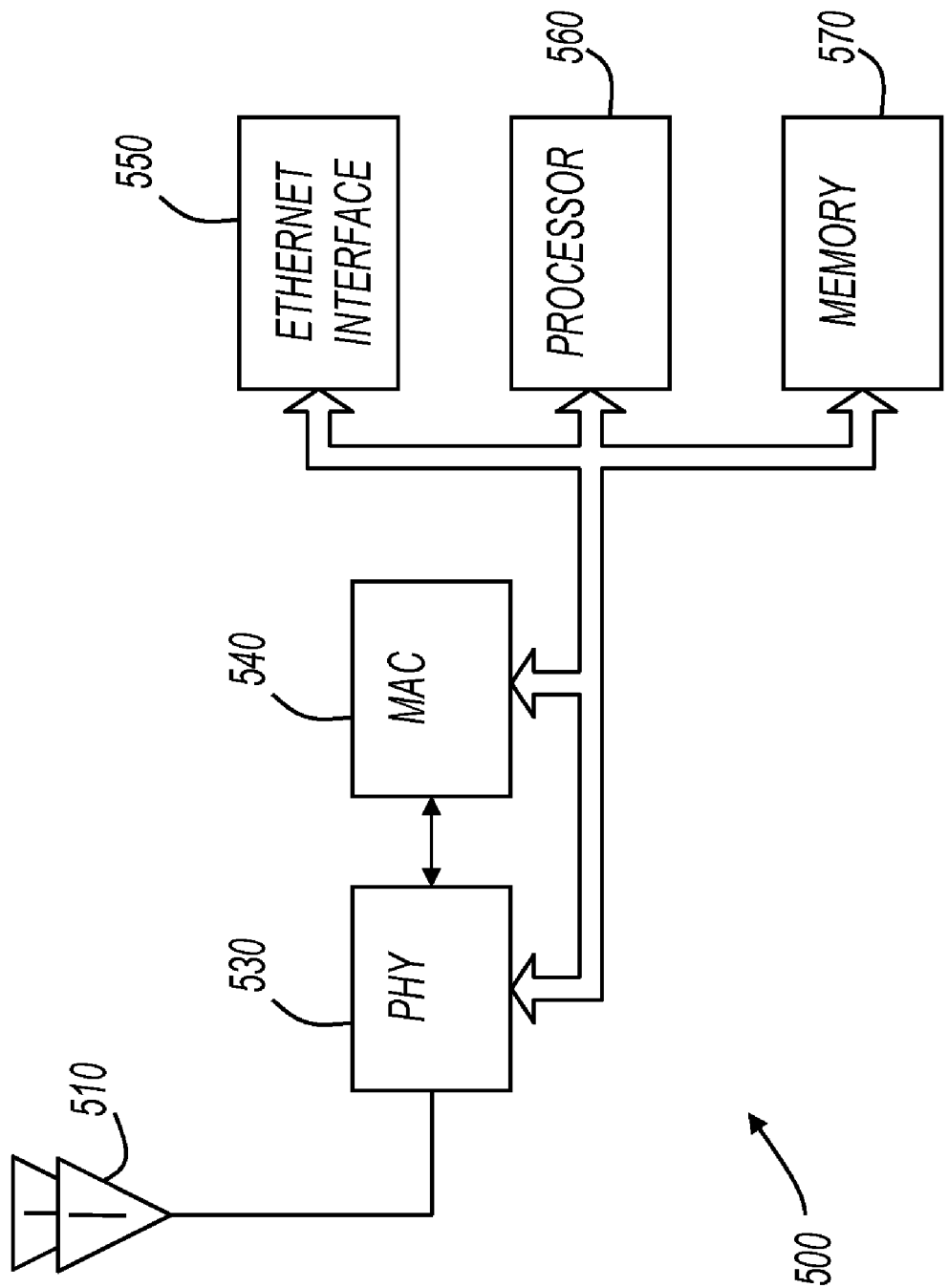
FIG. 5 shows an electronic system in accordance with various embodiments of the present invention.

FIG. 5 shows a system diagram in accordance with various embodiments of the present invention. Electronic system 500 includes antennas 510, physical layer (PHY) 530, media access control (MAC) layer 540, Ethernet interface 550, processor 560, and memory 570. In some embodiments, electronic system 500 may be a station capable increasing overall network throughput by reducing interference to neighboring stations as described above with reference to the previous figures. For example, electronic system 500 may be utilized in a wireless network as station 210 (FIGS. 2, 3). Also for example, electronic system 500 may be a station capable of performing the calculations shown in any of the equations above.

In some embodiments, electronic system 500 may represent a system that includes an access point, a mobile station, a base station, or a subscriber unit as well as other circuits. For example, in some embodiments, electronic system 500 may be a computer, such as a personal computer, a workstation, or the like, that includes an access point or mobile station as a peripheral or as an integrated unit. Further, electronic system 500 may include a series of access points that are coupled together in a network.

In operation, system 500 sends and receives signals using antennas 510, and the signals are processed by the various elements shown in FIG. 5. Antennas 510 may be an antenna array or any type of antenna structure that supports MIMO or sectorized processing. System 500 may operate in partial compliance with, or in complete compliance with, a wireless network standard such as an 802.11 standard.

Physical layer (PHY) 530 is coupled to antennas 510 to interact with a wireless network. PHY 530 may include circuitry to support the transmission and reception of radio frequency (RF) signals. For example, in some embodiments, PHY 530 includes an RF receiver to receive signals and perform "front end" processing such as low noise amplification (LNA), filtering, frequency conversion or the like. Further, in some embodiments, PHY 530 includes transform mechanisms and beamforming circuitry to support MIMO signal processing and/or sectorized processing. Also for example, in some embodiments, PHY 530 includes circuits to support frequency up-conversion, and an RF transmitter.

Media access control (MAC) layer 540 may be any suitable media access control layer implementation. For example, MAC 540 may be implemented in software, or hardware or any combination thereof. In some embodiments, a portion of MAC 540 may be implemented in hardware, and a portion may be implemented in software that is executed by processor 560. Further, MAC 540 may include a processor separate from processor 560.

In operation, processor 560 reads instructions and data from memory 570 and performs actions in response thereto. For example, processor 560 may access instructions from memory 570 and perform method embodiments of the present invention, such as method 400 (FIG. 4) or methods described with reference to other figures. Processor 560 represents any type of processor, including but not limited to, a microprocessor, a digital signal processor, a microcontroller, or the like.

Memory 570 represents an article that includes a machine readable medium. For example, memory 570 represents a random access memory (RAM), dynamic random access memory (DRAM), static random access memory (SRAM), read only memory (ROM), flash memory, or any other type of article that includes a medium readable by processor 560. Memory 570 may store instructions for performing the execution of the various method embodiments of the present invention. Memory 570 may also store beamforming matrices or beamforming vectors.

Although the various elements of system 500 are shown separate in FIG. 5, embodiments exist that combine the circuitry of processor 560, memory 570, Ethernet interface 550, and MAC 540 in a single integrated circuit. For example, memory 570 may be an internal memory within processor 560 or may be a microprogram control store within processor 560. In some embodiments, the various elements of system 500 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 550 may provide communications between electronic system 500 and other systems. For example, in some embodiments, electronic system 500 may be a desktop computer that utilizes Ethernet interface 550 to communicate with a wired network or to communicate with other computers. Some embodiments of the present invention do not include Ethernet interface 550. For example, in some embodiments, electronic system 500 may be a network interface card (NIC) that communicates with a computer or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   determining, at a wireless network station, when a neighbor wireless network station is transmitting and receiving to determine when the neighbor wireless network station is receiving transmissions;
   estimating, at the wireless network station, a channel between the wireless network station and the neighbor wireless network station, wherein said estimating a channel is based at least in part on beamforming weights of a response packet transmitted from the neighbor wireless network station;
   estimating, at the wireless network station, a signal-to-noise ratio (SNR) of a link between the neighbor wireless network station and a third wireless network station, based at least in part on detecting a data rate of packets transmitted from the neighbor wireless network station to the third wireless network station;
   determining transmit beamforming information for use by the wireless network station to reduce interference caused to the neighbor wireless network station when the neighbor wireless network station is receiving transmissions from the third wireless network station, wherein said determining is based at least in part on the estimated channel or the estimated SNR, or combinations thereof, to select a steering vector in a beamforming matrix that maximizes throughput between the neighbor wireless network station and the third wireless network station; and
   transmitting from the wireless network station to a target wireless network station using the transmit beamforming information.

2. The method of claim 1 wherein determining when the neighbor wireless network station is transmitting and receiving comprises interpreting a NAV value in a packet received from the neighbor wireless network station.

3. The method of claim 1 wherein determining when the neighbor wireless network station is transmitting and receiving comprises interpreting a TXOP value in a packet received from the neighbor wireless network station.

4. The method of claim 1 wherein determining when the neighbor wireless network station is transmitting and receiving comprises interpreting a CTS value in a packet received from the neighbor wireless network station.

5. The method of claim 1 wherein detecting the data rate comprises listening for acknowledgement packets sent from the neighbor wireless network station to the third wireless network station.

6. The method of claim 1 wherein determining transmit beamforming information comprises selecting one of a plurality of sector transmit antennas at the wireless network station.

7. The method of claim 1 wherein determining transmit beamforming information comprises determining a transmit beamforming matrix that attempts to maximize total network throughput in a neighborhood of the wireless network station.

8. An apparatus comprising a non-transitory machine-readable medium having instructions stored thereon that when accessed result in the machine performing:
   estimating, at a wireless network station, a channel between the wireless network station and a neighbor wireless network station, wherein said estimating a channel is based at least in part on beamforming weights of a response packet transmitted from the neighbor wireless packet;
   estimating, at the wireless network station, a signal-to-noise ratio (SNR) of a link between the neighbor wireless network station and a third wireless network station based at least in part on detecting a data rate of packets transmitted from the neighbor wireless network station to the third wireless network station;
   determining transmit beamforming information for use by the wireless network station to reduce interference caused to the neighbor wireless network station when the neighbor wireless network station is receiving transmissions from the third wireless network station, wherein said determining is based at least in part on the estimated channel or the estimated SNR, or combinations thereof, to select a steering vector in a beamforming matrix that maximizes throughput between the neighbor wireless network station and the third wireless network station; and
   transmitting from the wireless network station to a target wireless network station using the transmit beamforming information.

9. The apparatus of claim 8 wherein estimating the signal-to-noise ratio comprises listening for acknowledgement packets sent from the neighbor wireless network station to the third wireless network station.

10. The apparatus of claim 8 wherein estimating the channel between the wireless network station and the neighbor wireless network station comprises listening for packets sent by the neighbor wireless network station to the third wireless network station.

11. The apparatus of claim 8 wherein determining transmit beamforming information comprises selecting one of a plurality of sector transmit antennas at the wireless network station.

12. A wireless network station comprising:

a processor;

radio frequency circuitry coupled to the processor;

a plurality of antennas coupled to the radio frequency circuitry; and an article having a machine-readable medium encoded with instructions that when accessed result in the processor performing estimating a channel between the wireless network station and a neighbor wireless network station based at least in part on beamforming weights of a response packet transmitted from the neighbor wireless network station, estimating a signal-to-noise ratio (SNR) of a link between the neighbor wireless network station and a third wireless network station based at least in part on a detected data rate of packets transmitted from the neighbor wireless network station to the third wireless network station, determining transmit beamforming information for use by the wireless network station to reduce interference caused to the neighbor wireless network station when the neighbor wireless network station is receiving transmissions from the third wireless network station, wherein said determining is based at least in part on the estimated channel or the estimated SNR, or combinations thereof, to select a steering vector in a beamforming matrix that maximizes throughput between the neighbor wireless network station and the third wireless network station, and transmitting from the wireless network station to a target wireless network station using the transmit beamforming information.

13. The wireless network station of claim 12 wherein estimating the signal-to-noise ratio comprises listening for acknowledgement packets sent from the neighbor wireless network station to the third wireless network station.

14. The wireless network station of claim 13 wherein estimating the signal-to-noise ratio further comprises detecting a data rate of the acknowledgement packets sent from the neighbor wireless network station to the third wireless network station.

\* \* \* \* \*